United States Patent
De Vaal et al.

(10) Patent No.: US 7,871,729 B2
(45) Date of Patent: Jan. 18, 2011

(54) SYSTEM AND METHOD FOR MIXING GASES IN A FUEL CELL EXHAUST SYSTEM

(75) Inventors: Jacob W. De Vaal, Coquitlam (CA); Colin F. Keddie, Burnaby (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 1314 days.

(21) Appl. No.: 11/282,302

(22) Filed: Nov. 18, 2005

(65) Prior Publication Data
US 2007/0116621 A1 May 24, 2007

(51) Int. Cl.
*H01M 8/06* (2006.01)
*F01N 1/16* (2006.01)
(52) U.S. Cl. ...................... 429/408; 181/237
(58) Field of Classification Search ............... None
See application file for complete search history.

(56) References Cited

U.S. PATENT DOCUMENTS

| | | | | |
|---|---|---|---|---|
| 4,530,418 A * | 7/1985 | Currie | ........................ | 181/227 |
| 5,542,249 A | 8/1996 | Heath | ......................... | 60/293 |
| 6,401,449 B1 | 6/2002 | Hofmann et al. | ............... | 60/274 |
| 6,426,158 B1 | 7/2002 | Pratt et al. | ..................... | 429/13 |
| 6,461,751 B1 * | 10/2002 | Boehm et al. | .................. | 429/13 |
| 2002/0022172 A1 * | 2/2002 | Sahoda et al. | ................. | 429/34 |
| 2003/0215683 A1 * | 11/2003 | Bruck et al. | .................. | 429/26 |
| 2005/0045418 A1 * | 3/2005 | Choi et al. | ................... | 181/270 |

OTHER PUBLICATIONS

Fauske, H., et al., "Expanded-Metal Networks: A Safety Net to Thwart Gas Explosions," *Chemical Engineering Progress*, 97(12):66-71, Dec. 2001.

* cited by examiner

*Primary Examiner*—Dah-Wei D Yuan
*Assistant Examiner*—Adam A Arciero
(74) *Attorney, Agent, or Firm*—Patent Central LLC; Stephan A. Pendorf

(57) ABSTRACT

A system and method for reducing concentrations of reactants in gases flowing through an exhaust system are disclosed. Briefly described, one embodiment comprises creating a turbulent flow of gases along a periphery region of an exhaust pipe, the turbulent flow created by the gases transported over a wire mesh residing in the periphery region; and mixing the gases in the periphery region with a reactant gas being transported in a flow-through region, the mixing caused by the turbulent flow of gases, such that concentration of the reactant gas is reduced as the reactant gas is transported through the exhaust system.

17 Claims, 4 Drawing Sheets

Plain

Dutch

Twilled

Twilled Dutch

“SYSTEM AND METHOD FOR MIXING GASES IN A FUEL CELL EXHAUST SYSTEM”

BACKGROUND OF THE INVENTION

1. Field of the Invention

The present invention relates generally to fuel cells, and, more particularly, to exhaust systems.

2. Description of the Related Art

Electrochemical fuel cells convert reactants, namely fuel and oxidant fluid streams, to generate electric power and reaction products. Electrochemical fuel cells generally employ an electrolyte disposed between two electrodes, namely a cathode and an anode. An electrocatalyst, disposed at the interfaces between the electrolyte and the electrodes, typically induces the desired electrochemical reactions at the electrodes. The location of the electrocatalyst generally defines the electrochemically active area.

One type of electrochemical fuel cell is the polymer electrolyte membrane (PEM) fuel cell. PEM fuel cells generally employ a membrane electrode assembly (MEA) comprising a solid polymer electrolyte or ion-exchange membrane disposed between two electrodes. Each electrode typically comprises a porous, electrically conductive substrate, such as carbon fiber paper or carbon cloth, which provides structural support to the membrane and serves as a fluid diffusion layer. The membrane is ion conductive (typically proton conductive), and acts both as a barrier for isolating the reactant streams from each other and as an electrical insulator between the two electrodes. A typical commercial PEM is a sulfonated perfluorocarbon membrane sold by E.I. Du Pont de Nemours and Company under the trade designation NAFION®. The electrocatalyst is typically a precious metal composition (e.g., platinum metal black or an alloy thereof) and may be provided on a suitable support (e.g., fine platinum particles supported on a carbon black support).

In a fuel cell, an MEA is typically interposed between two separator plates that are substantially impermeable to the reactant fluid streams. The plates typically act as current collectors and provide support for the MEA. In addition, the plates may have reactant channels formed therein and act as flow field plates providing access for the reactant fluid streams to the respective porous electrodes and providing for the removal of reaction products formed during operation of the fuel cell.

In a fuel cell stack, a plurality of fuel cells are connected together, typically in series, to increase the overall output power of the assembly. In such an arrangement, one side of a given separator plate may serve as an anode flow field plate for one cell and the other side of the plate may serve as the cathode flow field plate for the adjacent cell. In this arrangement, the plates may be referred to as bipolar plates. Typically, a plurality of inlet ports, supply manifolds, exhaust manifolds and outlet ports are utilized to direct the reactant fluid to the reactant channels in the flow field plates. The supply and exhaust manifolds may be internal manifolds, which extend through aligned openings formed in the flow field plates and MEAs, or may comprise external or edge manifolds, attached to the edges of the flow field plates.

A broad range of reactants can be used in PEM fuel cells. For example, the fuel stream may be substantially pure hydrogen gas, a gaseous hydrogen-containing reformate stream, or methanol (in a direct methanol fuel cell). The oxidant may be, for example, substantially pure oxygen or a dilute oxygen stream such as air.

During normal operation of a PEM fuel cell, fuel is electrochemically oxidized on the anode side, typically resulting in the generation of protons, electrons and possibly other species depending on the fuel employed. The protons are conducted from the reaction sites at which they are generated, through the membrane, to electrochemically react with the oxidant on the cathode side. The electrons travel through an external circuit providing useable power and then react with the protons and oxidant on the cathode side to generate water reaction product.

The unused reactants are expelled out of the stack into the atmosphere via an exhaust system including a fuel exhaust pipe and an oxidant exhaust pipe. During fuel cell operation, especially during start-up, shut-down or restart, hydrogen may diffuse to the cathode side and consequently a mix of hydrogen and air will be present in the air exhaust pipe, sometimes with concentrations as high as 50/50 hydrogen/air, posing a significant flammability/detonability concern.

There have been attempts to reduce the hydrogen concentration in the air exhaust pipe by dilution through adding more air, or by stack voltage bleeddown to actively consume the hydrogen remaining in the anode loop.

Accordingly, although there have been advances in the field, there remains a need in the art for improving fuel cell exhaust systems. The present invention addresses these needs and provides further related advantages.

BRIEF SUMMARY OF THE INVENTION

A system and method for reducing concentrations of reactants in gases flowing through an exhaust system is disclosed. Briefly described, in one aspect, an embodiment may be summarized as a method comprising creating a turbulent flow of gases along a periphery region of an exhaust pipe, the turbulent flow created by the gases transported over a wire mesh residing in the periphery region; and mixing the gases in the periphery region with a reactant gas being transported in a flow-through region, the mixing caused by the turbulent flow of gases, such that concentration of the reactant gas is reduced as the reactant gas is transported through the exhaust system.

In another aspect, an embodiment may be summarized as an exhaust pipe that transports an oxidant gas and hydrogen exhausted from a fuel cell from an inlet of the exhaust pipe to an outlet of the exhaust pipe; and a wire mesh disposed within the exhaust pipe around a periphery of the exhaust pipe, the wire mesh causing a turbulent flow in portions of the exhaust pipe such that the oxidant transported through the exhaust pipe mixes with the hydrogen in the exhaust pipe.

These and other aspects of the invention will be evident upon reference to the following detailed description and attached drawings.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIGS. 4A-D illustrate selected wire mesh fabrics that may be used for the wire mesh embodiments of FIGS. 1-2 and 3A-C.

Figure 5:
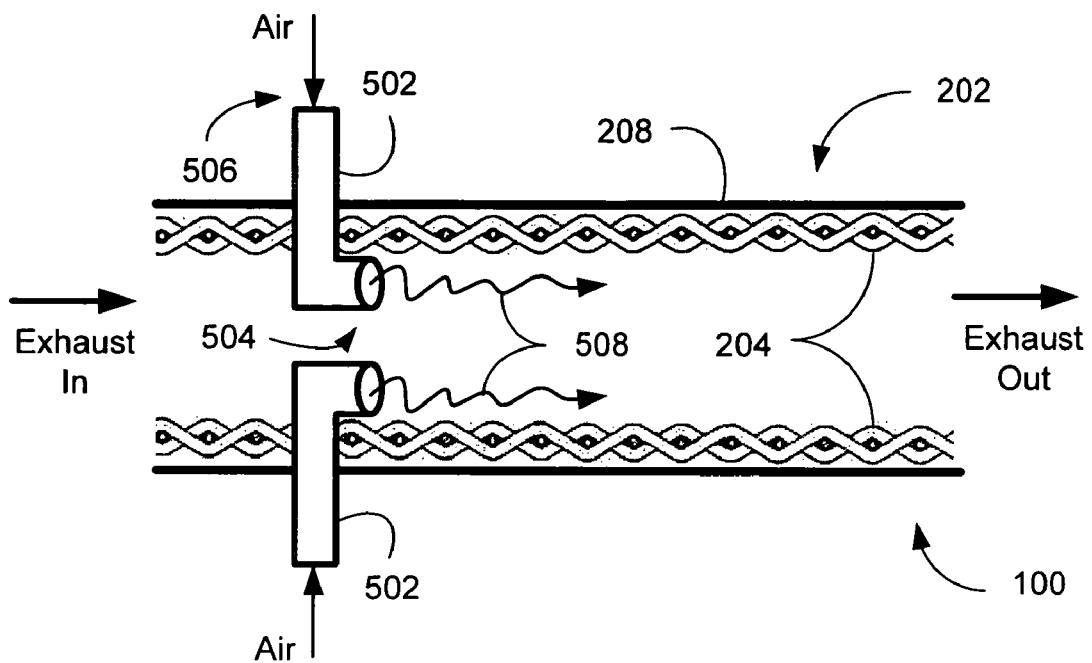

FIG. 5 illustrates an alternative embodiment of a oxidant exhaust system having one or more eductors disposed through the pipe wall.

Figure 6:
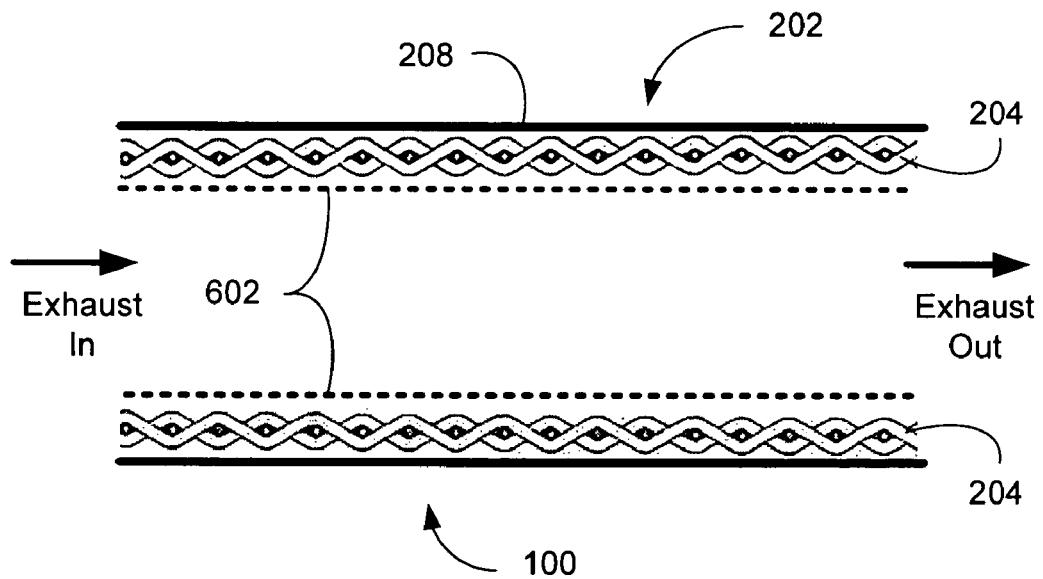

FIG. 6 illustrates an alternative embodiment of a oxidant exhaust system employing a catalyst to facilitate reaction of reactant gases passing through the exhaust pipe.

Figure 7:
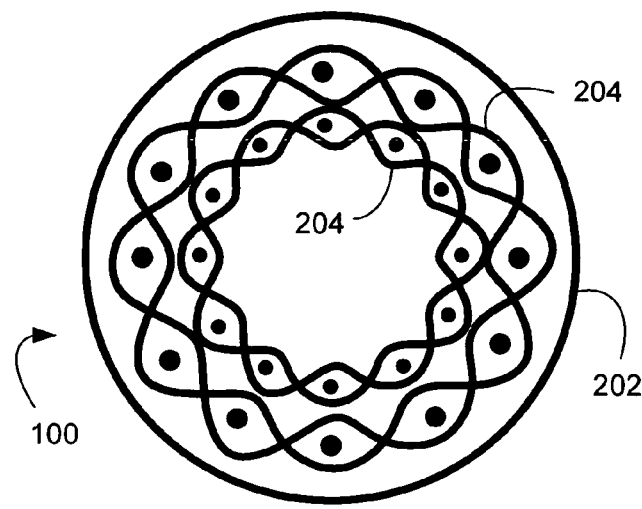

FIG. 7 illustrates an alternative embodiment of a oxidant exhaust system having a plurality of wire mesh layers disposed within the exhaust pipe.

Figure 8:
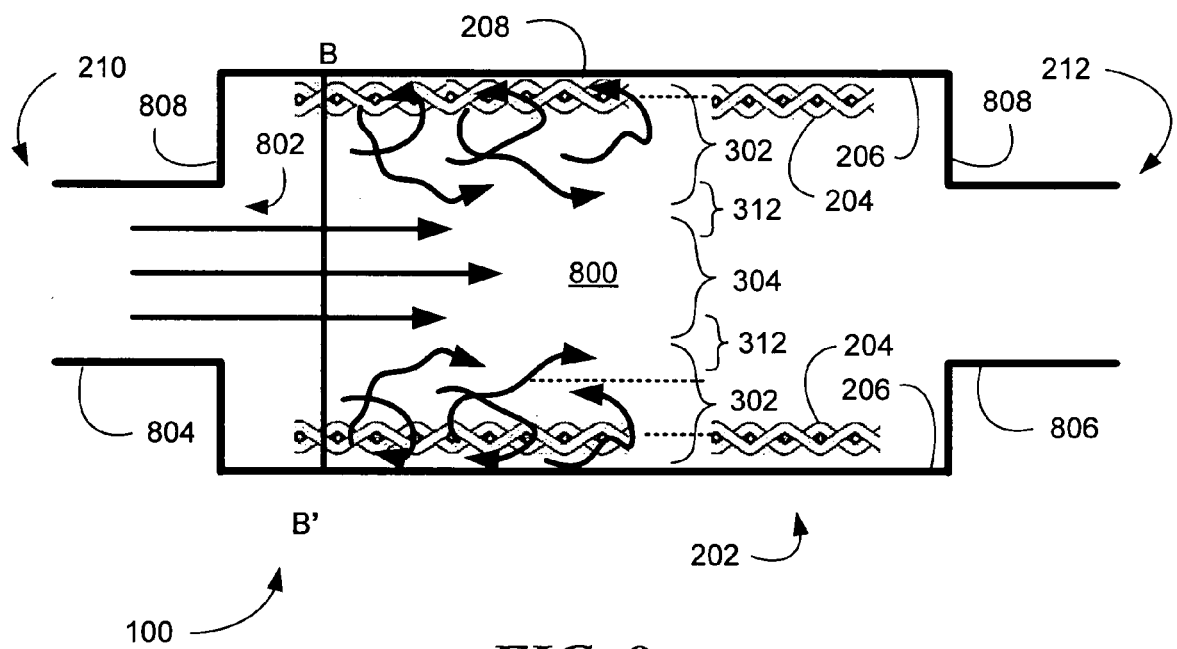

FIG. 8 illustrates an alternative embodiment of a oxidant exhaust system employing an increased diameter portion to increase the volume of mixable gasses.

DETAILED DESCRIPTION OF THE INVENTION

In the following description, certain specific details are set forth in order to provide a thorough understanding of various embodiments of the invention. One skilled in the art, however, will understand that the invention may be practiced without these details. In other instances, well-known structures associated with fuel cell systems have not been shown or described in detail to avoid unnecessarily obscuring descriptions of the embodiments of the invention.

Figure 1:
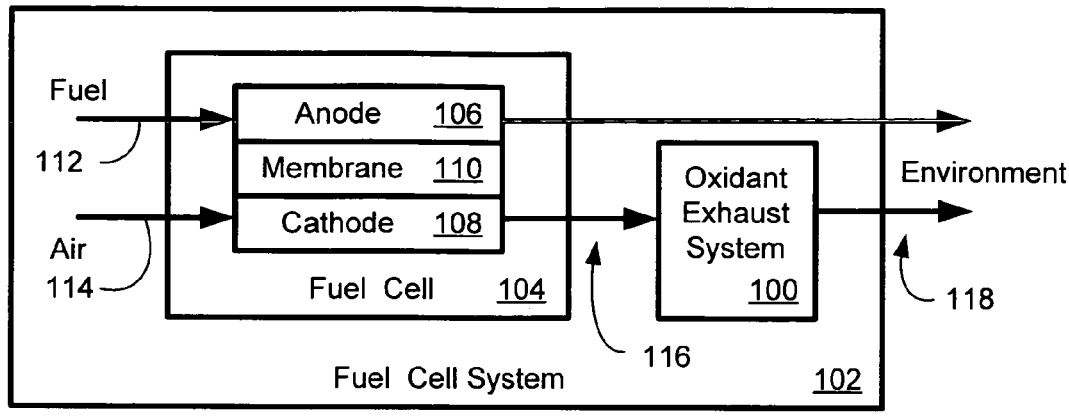
FIG. 1 is a block diagram of an embodiment of an oxidant exhaust system including a wire mesh residing in a fuel cell system.

FIG. 1 is a block diagram of an embodiment of a oxidant exhaust system 100 residing in a fuel cell system 102. The oxidant exhaust system 100 dilutes the relative percentage of hydrogen, or other types of reactant gases, with other gases such as oxidant (air) as the gases are exhausted through an exhaust system by generating turbulence in the velocity flow pattern of exhaust gases. More specifically, the generated turbulence, described in greater detail hereinbelow, causes mixing of portions of hydrogen diffused to the cathode side with the exhausted air in the exhaust system. That is, the air as it is transported through the exhaust system, dilutes the concentration of the hydrogen to desirable levels before venting out to the atmosphere. An exemplary benefit of reducing the concentration of or diluting exhausted reactant gases is a reduction in the flammability of exhaust gases.

The simplified fuel cell 104 residing in the fuel cell system 102 comprises an anode 106, a cathode 108 and a membrane 110. Fuel cell 104 may be any type of suitable fuel cell, such as a polymer electrolyte membrane (PEM) fuel cell or the like.

A reactant, or fuel, is supplied to the anode 106, via flow path 112. In the exemplary embodiment, hydrogen may be used as the reactant. A valve and/or a pressure regulator (not shown) may be used to control flow and/or pressure of the reactant in the flow path 112. Alternative embodiments of the oxidant exhaust system 100 may be configured to operate with fuel cells which use other modes of anode operation.

An oxidant, such as oxygen or air, is supplied to the cathode 108, via flow path 114. In an exemplary embodiment, air or oxygen is used as the reactant.

During the exhaust process, valves (not shown) of the fuel cell system 102 may be actuated to direct gases residing in the cathode 108 into the oxidant exhaust system 100, generally denoted by the flow paths 116. It is appreciated that any suitable configuration of flow paths 116 may be used to direct fluids from the cathode 108 into the oxidant exhaust system 100, and accordingly, such paths need not be described in detail herein for understanding the principles of operation of the various embodiments of the oxidant exhaust system 100.

Figure 2:
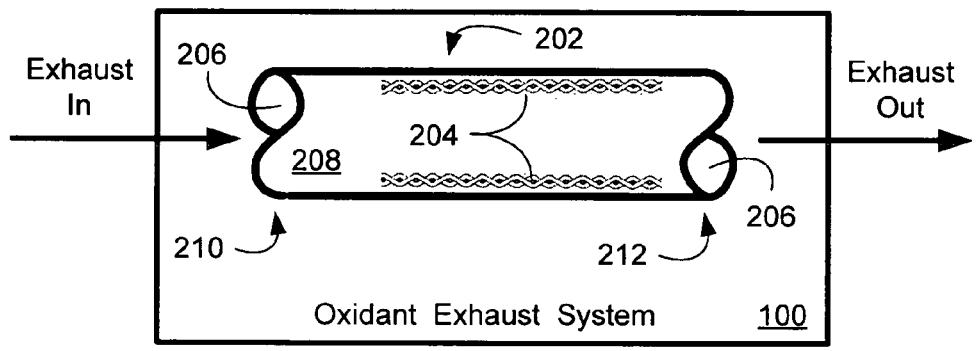
FIG. 2 illustrates a selected portion of the oxidant exhaust system of FIG. 1.

FIG. 2 illustrates a selected portion of the oxidant exhaust system 100 of FIG. 1. The oxidant exhaust system 100 comprises an oxidant exhaust pipe 202 and a wire mesh 204. Oxidant exhaust pipe 202 may be any suitable gas channeling device or the like, and is illustrated for convenience as a tubular pipe. Any suitable material, such as, but not limited to, metal, plastic or ceramic, may be used for the oxidant exhaust pipe 202 by the various embodiments. For convenience, the cross section of the oxidant exhaust pipe 202 is illustrated as circular (see also FIGS. 3B and 7). However, any suitable cross-section geometry may be used for the oxidant exhaust pipe 202 by the various embodiments.

Wire mesh 204 resides in the oxidant exhaust pipe 202 and is oriented substantially adjacent to an inner surface 206 of the wall 208. That is, the wire mesh 204 is disposed around the periphery of the oxidant exhaust pipe 202. Because the wire mesh 204 is disposed within and around the periphery of the oxidant exhaust pipe 202, a flow-through region 214 resides through a center portion of the oxidant exhaust pipe 202, providing an unobstructed passage or flow path for transport of exhaust gases.

Exhaust gases may be collected by a collection system (not shown), and then injected into inlet 210 of the oxidant exhaust pipe 202. As the gases are transported through the oxidant exhaust pipe 202, the wire mesh 204 causes turbulence in the gas flow, thereby mixing incoming gases with other gases residing in the oxidant exhaust pipe 202. Gases are ultimately vented out of the oxidant exhaust system 100, exiting the outlet 212 of the oxidant exhaust pipe 202. Venting may be directly out into the atmosphere or into another device, depending upon the embodiment and/or the specific application of the oxidant exhaust system 100.

Figure 3A:
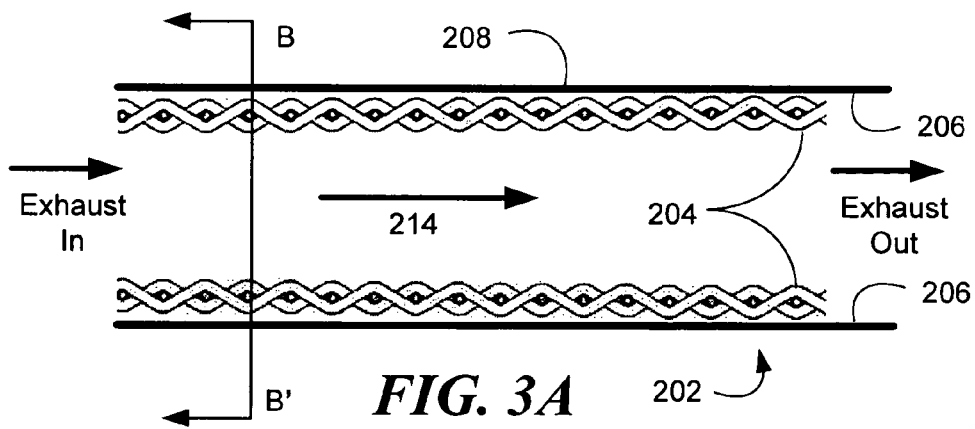
FIG. 3A is a longitudinal, cut-away view of a portion of the oxidant exhaust system of FIG. 2 showing in greater detail the wire mesh residing in the exhaust pipe.
Figure 3B:
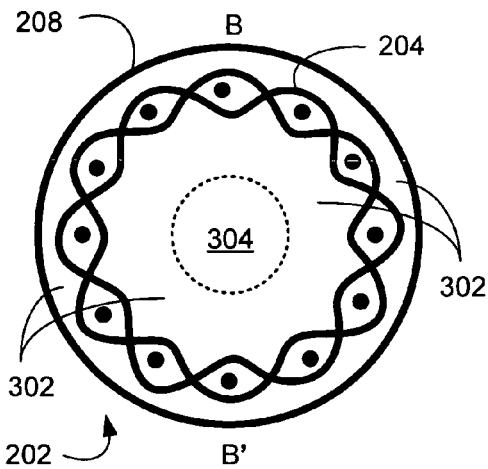
FIG. 3B is a cross-sectional view, at plane B-B', of the oxidant exhaust system showing the wire mesh residing in the exhaust pipe.
Figure 3C:
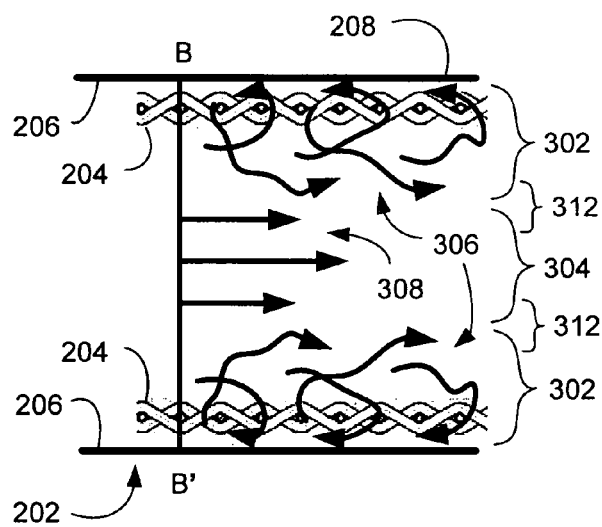
FIG. 3C is a gas flow velocity diagram indicating relative gas flow velocities in the oxidant exhaust system at plane B-B' of FIG. 3A.
Figure 4A:
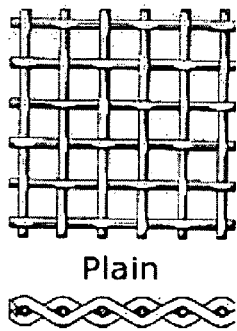
Figure 4B:
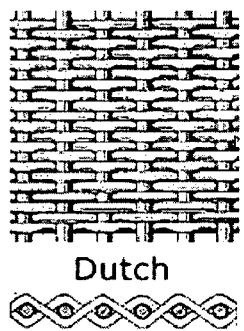
Figure 4C:
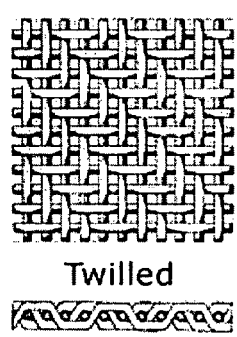
Figure 4D:
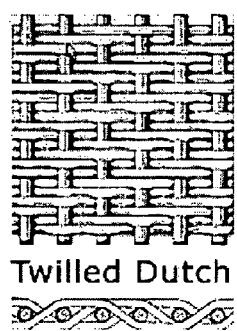

FIG. 3A is a longitudinal, cut-away view of a portion of the oxidant exhaust system 100 of FIG. 2 showing in greater detail the wire mesh 204 residing in the oxidant exhaust pipe 202. FIG. 3B is a cross-sectional view, at plane B-B', of the oxidant exhaust system 100 showing the wire mesh 204 residing in the oxidant exhaust pipe 202. FIG. 3C is a gas flow velocity diagram indicating relative gas flow directions and/or velocities in the oxidant exhaust system 100 at plane B-B' of FIG. 3A.

It is apparent from FIGS. 3A-C that the wire mesh 204, in this exemplary embodiment, is similar to a sleeve inserted inside the walls 208 of the oxidant exhaust pipe 202. As gas moves from the inlet 210 to the outlet 212 (FIG. 2), gas traveling along a periphery region 302 of the oxidant exhaust pipe 202 is in contact with the wire mesh 204.

Accordingly, functional forces between the moving gas and the surfaces of the wire mesh 204 causes a turbulent flow of the gas being transported along the periphery region 302 (FIG. 3C).

The relative direction of turbulent gas flow along the plane B-B' of the periphery region 302 of oxidant exhaust pipe 202 is random through the fabric/structure of the wire mesh 204, as generally indicated by the directional arrows 306 (FIG. 3C). The relative velocity and direction of gas traveling along the flow-through region 304 is generally indicated by the directional arrows 308 (FIG. 3C). Thus, it is appreciated that gas flowing in the flow-through region 304 is transported in a substantially laminar fashion. The highest velocity of the exhaust gas occurs in the center of the flow-through region 304. The slowest velocity of the exhaust gas occurs in or along the periphery region 302.

It is appreciated that the velocity of the gas in the periphery region 302 is less than the relative velocity of gases in the flow-through region 304. Gases in the periphery region 302 are slowed by friction between the gas and the wire mesh 204, and by friction between the gas and the inner surface 206. Accordingly, gases initially moving into the flow-through region 304 may more quickly travel from the inlet 210 into the interior of the oxidant exhaust pipe 202.

As noted above, gas being transported through the flow-through region 304 flows in a substantially laminar flow pattern. At an interface region 312 between gases flowing in the periphery region 302 and gases flowing in the flow-through region 304, the gases are mixed as a result of at least the created turbulent flow. Furthermore, velocity differences of gases in the interface region 312 (relative velocity differences between the gases of the flow-through region 304 and the periphery region 302) may contribute to the mixing. That is, the created turbulence and/or velocity differences mixes the gases transported in the periphery region 302 with other gases in and/or around the flow-through region 304. Furthermore, it is appreciated that there is a mixing of the gases transported through the periphery region 302 itself.

As noted above, during certain times during fuel cell operation, oxidant gases having a relatively high concentration of hydrogen, may be exhausted through the oxidant exhaust system 100. For example, during start-up of the fuel cell 104 (FIG. 1), a volume of oxidant gas having an undesirable concentration of hydrogen, may be introduced into the inlet 210 of the exhaust pipe. Other gases, such as inert gases or air, will already reside within the oxidant exhaust pipe 202, such as in the periphery region 302. As the mixture of hydrogen and air enters into the oxidant exhaust pipe 202, the turbulence induced by the various embodiments of the oxidant exhaust system 100 will cause a mixing of the hydrogen with air already residing in the oxidant exhaust pipe 202. That is, the hydrogen will become diluted, or less concentrated, as the air/hydrogen mixture is exhausted through the oxidant exhaust pipe 202. When the reactant exits the oxidant exhaust pipe 202, at outlet 212, the concentration of the exiting gases will have a desirable level or concentration of hydrogen as a result of the mixing occurring along the length of the oxidant exhaust pipe 202 having the wire mesh 204 disposed therein.

FIGS. 4A-D illustrate selected exemplary wire mesh fabrics that may be used for the wire mesh 204 embodiments of FIGS. 2-3. Any suitable weave may be used, including the illustrated plain weave of FIG. 4A, the dutch weave of FIG. 4B, the twilled weave of FIG. 4C and the twilled-dutch weave of FIG. 4D. The weave patterns of FIGS. 4A-D are intended to merely illustrate some of the possible weave patterns used by various embodiments of a oxidant exhaust system 100 (FIG. 1). Other types of patterns and configurations may be used, such as an expanded metal mesh or perforated screen plate/mesh. Mesh patterns may be square, rectangular, diamond, hexagonal or other suitable geometric patterns. A crimped wire mesh may provide additional surface irregularities on the wire mesh 204 to further increase turbulence of gases passing through the periphery region 302 (FIGS. 3B-C). Any suitable thickness of wire mesh may be used. If the mesh is made of metal, preferably aluminum, along with dilution the mesh reduces the gradient in flammable concentration along the pipe which has a strong mitigating effect on combustion flame speeds and pressures that can develop in the exhaust pipe during combustion.

FIG. 5 illustrates an alternative embodiment of a oxidant exhaust system 100 having one or more eductors 502 disposed through the pipe wall 208. As gases travel past the outlet 504, thereby causing a vacuum at the outlet 504, additional air is drawn into an inlet 506. The air enters into the oxidant exhaust pipe 202, further diluting the hydrogen passing by the eductors 502. Other embodiments may draw other selected gases, such as inert nitrogen, through the eductors 502. Eductors 502 may be placed at any desirable and/or convenient location along the length of the oxidant exhaust pipe 202. Also, forced air may be introduced through the eductors to enhance the vacuum effect created at the outlet 504. Furthermore, any suitable number of eductors 502 may be used by the various embodiments.

FIG. 6 illustrates an alternative embodiment of a oxidant exhaust system 100 employing a catalyst layer 602 to facilitate reaction of reactant gases passing through the oxidant exhaust pipe 202. As hydrogen comes in contact with the catalyst 602 and the oxidant gases the concentration of hydrogen in the oxidant exhaust pipe 202 is further reduced. The catalyst is coated on a perforated sheet to allow better gas circulation to the mesh.

In an alternative embodiment, the catalyst layer 602 may be adjacent to and located between the wire mesh 204 and the wall 208. Or, two similar catalyst layers 602 can be located on the pipe adjacent to the mesh, one between the mesh and the wall 208 and the other one on the other side of the mesh, towards the central portion of the pipe. In another embodiment, a catalyst coating may be applied to the wire mesh 204 and/or to the inner surface of the pipe wall 208. Any type of catalyst structure and/or coating may be employed by the various embodiments of the oxidant exhaust system 100.

FIG. 7 illustrates an alternative embodiment of a oxidant exhaust system 100 having a plurality of wire mesh layers 204 disposed within the oxidant exhaust pipe 202. Here, two layers of wire mesh 204 are illustrated, though any suitable number of layers may be used by the various embodiments. Different types of mesh sizes and/or patterns may be used. Or, a larger sheet of wire mesh may be rolled a plurality of times around itself to form the plurality of wire mesh layers 204.

FIG. 8 illustrates an alternative embodiment of a oxidant exhaust system 100 employing an increased diameter portion 800 to increase the volume of mixable gasses. The increased diameter portion 800 of the oxidant exhaust pipe 202 increases the volume of that portion of the oxidant exhaust system 100. Gasses 802 entering through inlet 210 are initially transported through a through pipe portion 804. Upon entry into the increased diameter portion 800, gas velocity decreases. The slower moving gasses more readily mix with other gasses residing in the increased diameter portion 800. In some embodiments, the outlet 212 comprises another smaller diameter through pipe portion 806. The diameters of through pipe portions 804 and 806 may be different, depending upon the embodiment.

For convenience, the transition between the through pipe portion 804 and the increased diameter portion 800, and the transition between the increased diameter portion 800 and the through pipe portion 804, are illustrated by the straight, vertically oriented transition wall 808. In other embodiments, the transition wall 808 may be sloped, curvilinear or otherwise formed into any suitable shape.

As noted above and illustrated in FIGS. 3A-C, the wire mesh 204, in the described exemplary embodiment, is similar to a sleeve inserted inside the walls 208 of the oxidant exhaust pipe 202. Accordingly, wire mesh 204, may be formed from a sheet of wire mesh rolled into a tube structure having a suitable diameter to facilitate insertion of the rolled wire mesh 204 into the oxidant exhaust pipe 202. In one embodiment, the side ends of the wire mesh 204, when rolled into a tubular form, could be secured with a fastener (not shown), secured with a suitable adhesive, or welded or soldered, such that the diameter of the rolled wire mesh 204 is fixed. Such an embodiment facilitates insertion into the oxidant exhaust pipe 202. Accordingly, portions of the outside of the rolled wire mesh 204 may not be in contact with the inner surface 206. Alternatively, the side ends of the wire mesh 204, when rolled into a tubular form, may not be secured such that the wire mesh 204, after insertion into the oxidant exhaust pipe 202, expands to come into contact with relatively more or all of the inner surface 206. In yet another embodiment, the diameter of the wire mesh 204 may be fixed such that the wire mesh must be forcibly inserted into the oxidant exhaust pipe 202 so that the wire mesh 204, after insertion into the oxidant exhaust pipe 202, is in frictional contact with some or all of the inner surface 206.

Turbulent flow within the oxidant exhaust pipe 202 of alternative embodiments of the oxidant exhaust system 100 may be generated by other structures of the wire mesh. For example, a helical coil of wire mesh may be disposed within the oxidant exhaust pipe 202. Another embodiment may employ strips of wire mesh running the length, or running portions of the length, of the oxidant exhaust pipe 202. Yet another embodiment may employ a plurality of rings of wire mesh across the length or portions of the length of the oxidant exhaust pipe 202.

For convenience of describing the various embodiments of a oxidant exhaust system 100, various structures and features were separately described. Other embodiments may employ combinations of the above-described alternative embodiments. For example, but not limited to, one embodiment may employ the above-described catalyst 702 (FIG. 6) and one or more eductors 604 (FIG. 5).

As used herein, the term "fluid" corresponds to gases and/or liquids. Accordingly, the terms "fluid" and the term "gas" (or the like) may be interchangeably used within the specification and/or claims.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A fuel cell exhaust system which reduces concentrations of hydrogen in an oxidant exhaust, comprising:
   an oxidant exhaust pipe that transports a gas flow comprising a mixture of oxidant gas and hydrogen gas exhausted from a fuel cell from an inlet of the exhaust pipe to an outlet of the exhaust pipe; and
   a wire mesh disposed within the exhaust pipe around a periphery of the exhaust pipe, leaving a centrally situated flow-through area of said pipe unobstructed, said wire mesh having a weave pattern running along a length and circumference of the exhaust pipe, and said wire mesh causing a turbulent flow in portions of the exhaust pipe surrounding said flow-through area, in proximity to the wire mesh, such that the hydrogen gas transported through the exhaust pipe mixes with the oxidant gas trapped in the wire mesh.

2. The exhaust system of claim 1 wherein the oxidant gas is air or oxygen.

3. The exhaust system of claim 1, further comprising:
   at least one eductor having an inlet that receives another gas and an outlet protruding into the exhaust pipe such that the air is drawn into the exhaust pipe by a vacuum.

4. The exhaust system of claim 1, further comprising:
   a catalyst that causes a reaction of the hydrogen gas with an oxidant gas residing in the exhaust pipe.

5. The exhaust system of claim 4 wherein the catalyst is deposited on a structure disposed adjacent to the wire mesh, the structure having a plurality of holes disposed therein to facilitate gas circulation.

6. The exhaust system of claim 4 wherein the catalyst is a coating on the wire mesh.

7. The exhaust system of claim 1 wherein the wire mesh is a helical coil disposed within the exhaust pipe.

8. The exhaust system of claim 1 wherein the wire mesh is made of a metal to reduce the flammability of the gas mixture.

9. The exhaust system of claim 8 wherein the metal is aluminum.

10. The exhaust system of claim 1 wherein the wire mesh is made of aluminum.

11. The exhaust system of claim 1 wherein the oxidant exhaust pipe further comprises:
    an increased diameter portion, wherein a volume of the transported mixture of the oxidant gas and the hydrogen gas is increased as the gas mixture enters into the increased diameter portion.

12. The exhaust system of claim 1, wherein:
    gases flowing unobstructed through the flow-through region are transported in a substantially laminar flow; and
    gases flowing in proximity to the periphery of said pipe where the wire mesh resides are transported in a substantially turbulent flow;
    whereby the hydrogen gas flowing through the flow-through region and the oxidant gas trapped in the wire mesh mix as the substantially turbulent flow interacts with the substantially laminar flow.

13. The exhaust system of claim 12, wherein the mixing occurs through an interface region between the flow-through region and the periphery region.

14. The exhaust system of claim 12, wherein relative velocities of the gases flowing along the periphery of said pipe and gases flowing through the flow-through region are different, such that the gases further mix together.

15. A fuel cell exhaust system which reduces concentrations of hydrogen in an oxidant exhaust pipe, comprising:
    an oxidant exhaust pipe that transports a mixture of oxidant gas and hydrogen gas exhausted from a fuel cell from an inlet of the exhaust pipe to an outlet of the exhaust pipe;
    a wire mesh disposed within the exhaust pipe around a periphery of the exhaust pipe, the wire mesh having a weave pattern running along a length and circumference of the exhaust pipe, the wire mesh causing a turbulent flow in portions of the exhaust pipe such that the hydrogen gas transported through the exhaust pipe mixes with the oxidant gas in the exhaust pipe;
    a flow-through region that resides in a central portion of the exhaust pipe, wherein gases flowing unobstructed through the flow-through region are transported in a substantially laminar flow; and
    a periphery region around the periphery of the exhaust pipe wherein the wire mesh resides, wherein the other gases flowing through the periphery region are transported in a substantially turbulent flow;

such that the hydrogen gas flowing through the flow-through region and the oxidant gas trapped in the wire mesh mix as the substantially turbulent flow interacts with the substantially laminar flow.

16. A fuel cell exhaust system which reduces concentrations of hydrogen in an oxidant exhaust, comprising:

an oxidant exhaust pipe that transports a gas flow comprising a mixture of oxidant gas and hydrogen gas exhausted from a fuel cell from an inlet of the exhaust pipe to an outlet of the exhaust pipe; and a wire mesh disposed within the exhaust pipe around a periphery of the exhaust pipe, leaving a centrally situated flow-through area of said pipe unobstructed, said wire mesh causing a turbulent flow in portions of the exhaust pipe surrounding said flow-through area, in proximity to the wire mesh, such that the hydrogen gas transported through the exhaust pipe mixes with the oxidant gas trapped in the wire mesh, wherein the wire mesh has a weave pattern that runs along a length and circumference of the exhaust pipe and the wire mesh is a sheet rolled into a tube structure having a suitable diameter to facilitate insertion of the rolled wire mesh into the exhaust pipe.

17. The exhaust system of claim 16 wherein the wire mesh is the sheet rolled into a plurality of layers.

* * * * *